United States Patent

Schote et al.

Patent Number: 5,362,092
Date of Patent: Nov. 8, 1994

[54] APPARATUS FOR CONNECTING A CONTROL ARM WITH A BEARING

[75] Inventors: Norbert Schote, Ammerbuch; Karl Sommerer, Wiernsheim, both of Germany

[73] Assignee: Dr. Ing. h.c.F. Porsche AG, Weissach, Germany

[21] Appl. No.: 91,356

[22] Filed: Jul. 15, 1993

[30] Foreign Application Priority Data

Jul. 17, 1992 [DE] Germany .............................. 4223609

[51] Int. Cl.⁵ .......................................... B60G 11/22
[52] U.S. Cl. ................................... 280/673; 280/717
[58] Field of Search ............... 280/673, 688, 690, 691, 280/717, 675; 411/399, 546

[56] References Cited

U.S. PATENT DOCUMENTS

| | | | |
|---|---|---|---|
| 2,939,720 | 6/1960 | Wroby | 280/673 |
| 3,436,069 | 4/1988 | Henschen | 280/717 |
| 4,609,315 | 9/1986 | Briles | 411/399 |
| 4,732,407 | 3/1988 | Oyama et al. | 280/673 |

FOREIGN PATENT DOCUMENTS 0937248 11/1973 Canada ...................... 280/673

Primary Examiner—Margaret A. Focarino
Assistant Examiner—Christopher P. Ellis
Attorney, Agent, or Firm—Evenson, McKeown, Edwards & Lenahan

[57] ABSTRACT

A control arm for a wheel suspension link for a motor vehicle is connected with the vehicle body by way of an elastic bearing. For this purpose, a holding element is arranged between the control arm and the bearing, which holding element is held, on the one hand, in a front face recess of the control arm in a non-rotatable manner and is, on the other hand, connected with a bearing sleeve of the control arm bearing.

6 Claims, 1 Drawing Sheet

APPARATUS FOR CONNECTING A CONTROL ARM WITH A BEARING

BACKGROUND AND SUMMARY OF THE INVENTION

This invention relates to an apparatus for connecting a control arm of a motor vehicle wheel suspension link with the vehicle body by way of an elastic bearing by means of a threaded connection.

In the case of the connection of a control arm with an elastic bearing which is fastened to the vehicle body, a displacement of the elastic control arm bearing with respect to the bearing usually takes place when the connection is established by way of a screw. This has the result that the elastic portions in the bearing are twisted.

It is an object of the invention to provide an apparatus for connecting a control arm with a bearing which avoids these disadvantages, ensures a defined fitting position of the elastic bearing, and permits a simple mounting or fastening of the control arm on the bearing.

According to the invention, this object is achieved by providing an apparatus for connecting a control arm of a wheel suspension link for a motor vehicle by way of an elastic bearing with the vehicle body by means of a screwed connection, wherein a holding element is arranged between the control arm and the bearing, said holding element being, on the one hand, non-rotatably held in a front face recess of the control arm and, on the other hand, being connected with a bearing sleeve of the control arm bearing.

The principal advantages achieved by means of the invention are that, as the result of the arrangement of the holding element with a polygonal projection between the control arm and the control arm bearing, when the connection is established by way of a screw, torsion of the elastic portions of the control arm bearing is avoided and twisting is therefore prevented.

Preferably, the projection of the holding element comprises a pin which has a square cross-section and projects into a corresponding recess of the control arm. This pin is followed by a conical part which is connected with a corresponding conical recess in the control arm. In a bore of the holding element, the free end of a bearing sleeve is held by means of a press fit, which bearing sleeve is embedded in a rubber elastic layer.

The bearing sleeve is provided with a bore for a fastening screw which penetrates the holding element and is fastened on the control arm by way of a nut.

Because of its polygonal projection in connection with the conical section and the press fit on the bearing sleeve, the holding element achieves a defined fitting position for the rubber bearing when the control arm is fastened on the control arm bearing, whereby a twisting of the rubber elastic element in the bearing is avoided. At the same time, the control arm is fastened securely with respect to the bearing.

Other objects, advantages and novel features of the present invention will become apparent from the following detailed description of the invention when considered in conjunction with the accompanying drawings.

DETAILED DESCRIPTION OF THE DRAWINGS

Figure 1:
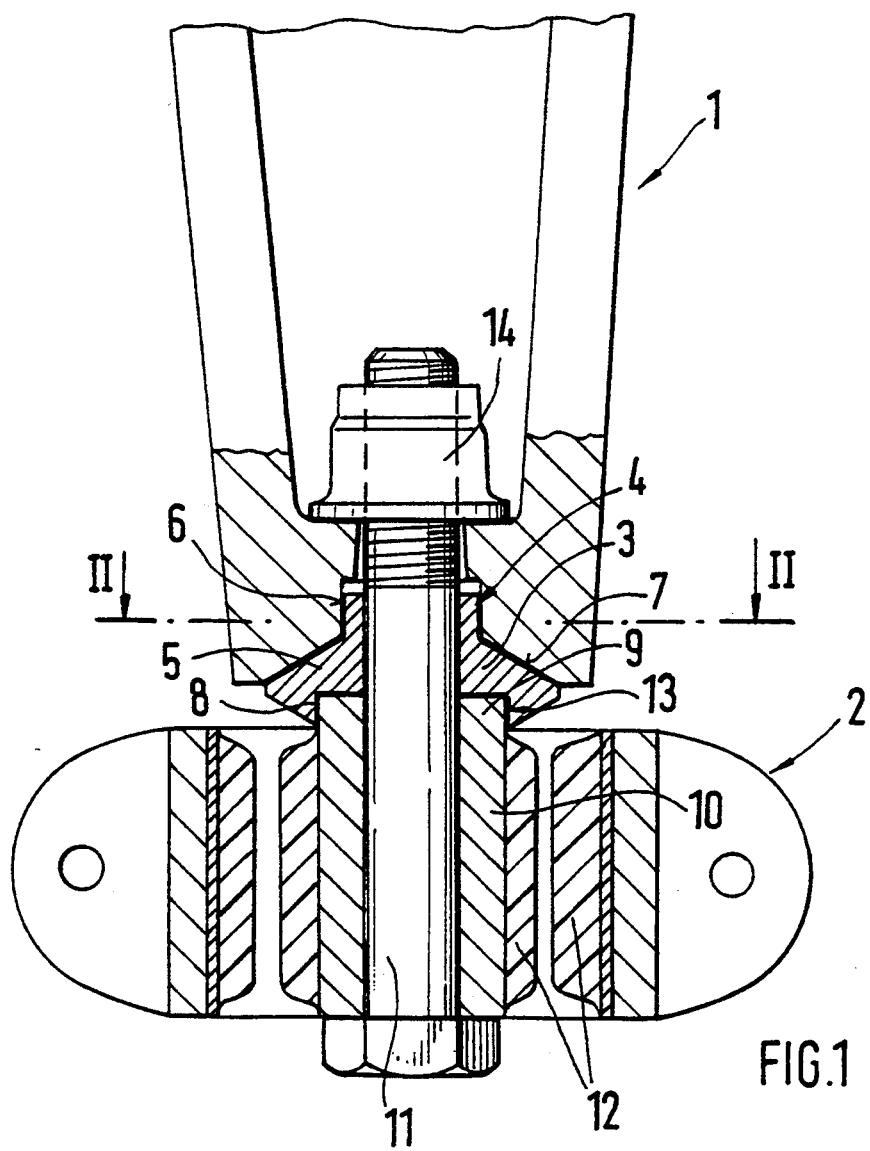
FIG. 1 is a schematic horizontal sectional view of a control arm bearing with a fastened wheel suspension control arm, constructed according to a preferred embodiment of the invention.

A control arm 1 for a wheel of a motor vehicle is held on its end in a control arm bearing 2 which is fastened, for example, on the vehicle body.

A holding element 3 is arranged between the control arm bearing 2 and the control arm 1. This holding element 3 comprises a projection 4 of a polygonal cross-section which consists, for example, of a square. This projection is followed by a conical section 5. The projection 4 as well as the section 5 are arranged on the front face in corresponding recesses 6 and 7 of the control arm 1.

An end of the holding element 3 which faces away from the square has a centric bore 8 into which a free end 9 of a bearing sleeve 10 of the control arm bearing 2 projects. The bearing sleeve 10 is surrounded by a rubber elastic layer 12 of defined elastic characteristics.

By means of a screw 11, which is fitted through the bearing sleeve 10 and the holding element 3 and which is secured in the control arm 1 by way of a nut 14, the bearing is connected with the control arm 1 in a manner that is secured with respect to torsion.

Figure 2:
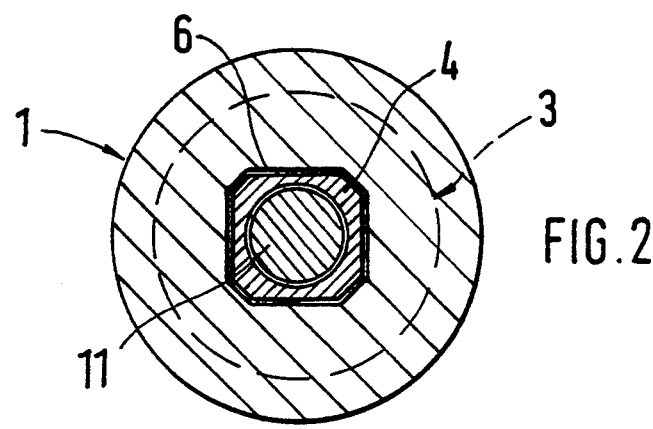
FIG. 2 is a sectional view according to Line II—II of FIG. 1.

As illustrated in detail in FIG. 2, the control arm 1 or the bearing 2 can be precisely aligned before being connected. Before a fastening by way of the screw 11, the holding element 3 can be freely rotated with respect to the bearing sleeve 10 and the control arm 1. When the desired position of the structural members 1 and 2 with respect to one another is achieved, they are fitted together and connected by way of the screw 11. As a result, the control arm 1 and the bearing 2 are each held in a respective precise position with respect to the other component, in which case the bearing sleeve 10 is held in the bore 8 by means of a press fit.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An apparatus for connecting a control arm of a wheel suspension link for a motor vehicle by way of an elastic bearing with the vehicle body by means of a screwed connection, wherein a holding element is arranged between the control arm and the bearing, which holding element is non-rotatably held in a front face recedes of the control arm and is connected with a bearing sleeve of the control arm bearing, wherein the holding element has a projection of a polygonal cross-section which is followed by a conical section and the projection is arranged to fit in said front face recess, said recess being correspondingly constructed in a polygonal shape to receive said projection in a form-locking manner.

2. An apparatus according to claim 1, wherein the projection has a cross-section in the shape of a square on one free end facing the front face of the control arm, the opposite free end directed toward the front face of the bearing sleeve having a bore in which the bearing sleeve is held with a press fit.

3. An apparatus according to claim 2, wherein the bearing sleeve is surrounded by at least one elastic layer of defined characteristics and the sleeve projects out of the bearing on the front face, projects into a bore of the holding element, and a screw penetrates the bearing sleeve as well as the holding element, and the bearing can be fastened to the control arm by way of a nut.

4. An apparatus for connecting a control arm of a wheel suspension link for a motor vehicle by way of an elastic bearing with the vehicle body by means of a screwed connection, wherein a holding element is arranged between the control arm and the bearing, which holding element is non-rotatably held in a front face recess of the control arm and is connected with a bearing sleeve of the control arm bearing, wherein the holding element has a projection of a polygonal cross-section and the projection is arranged to fit in said front face recess, said recess being correspondingly constructed in a polygonal shape to receive said projection in a form-locking manner.

5. An apparatus according to claim 4, wherein the projection has a cross-section in the shape of a square on one free end facing the front face of the control arm, the opposite free end directed toward the front face of the bearing sleeve having a bore in which the bearing sleeve is held with a press fit.

6. An apparatus according to claim 5, wherein the bearing sleeve is surrounded by at least one elastic layer of defined characteristics and the sleeve projects out of the bearing on the front face, projects into a bore of the holding element, and a screw penetrates the bearing sleeve as well as the holding element, and the bearing can be fastened to the control arm by way of a nut.

* * * * *